US006934680B2

(12) United States Patent
Holzapfel

(10) Patent No.: US 6,934,680 B2
(45) Date of Patent: Aug. 23, 2005

(54) METHOD FOR GENERATING A STATISTIC FOR PHONE LENGTHS AND METHOD FOR DETERMINING THE LENGTH OF INDIVIDUAL PHONES FOR SPEECH SYNTHESIS

(75) Inventor: Martin Holzapfel, Munich (DE)

(73) Assignee: Siemens Aktiengesellschaft, Munich (DE)

(*) Notice: Subject to any disclaimer, the term of this patent is extended or adjusted under 35 U.S.C. 154(b) by 790 days.

(21) Appl. No.: 09/899,536

(22) Filed: Jul. 6, 2001

(65) Prior Publication Data

US 2002/0016709 A1 Feb. 7, 2002

(30) Foreign Application Priority Data

Jul. 7, 2000 (DE) ........................................ 100 33 104

(51) Int. Cl.[7] ................................................ G10L 15/00
(52) U.S. Cl. ........................ 704/245; 704/260; 704/258
(58) Field of Search ................................ 704/238, 239, 704/241, 243, 245, 258, 260, 267

(56) References Cited

U.S. PATENT DOCUMENTS 5,490,234 A 2/1996 Narayan
5,970,452 A 10/1999 Sharman
6,546,367 B2 * 4/2003 Otsuka ....................... 704/260

FOREIGN PATENT DOCUMENTS

DE 694 20 547 T2 7/2000

OTHER PUBLICATIONS

Huang et al.; Spoken Language processing: Prentice–Hall Inc; 2001; pp. 430–434.*
Georg Fries et al., "Felix–A TTS System with Improved Pre–processing and Source Signal Generation", 5th European Conference on Speech Communication and Technology, vol. 2 of 5, Sep. 22, 1997, pp. 589–592.
Translation of European Search Report for EP 01 11 4696.

* cited by examiner

*Primary Examiner*—Abul K. Azad
(74) *Attorney, Agent, or Firm*—Staas & Halsey LLP

(57) ABSTRACT

A statistic for phone lengths is generated by determining the length of individual phones for speech synthesis. A primary statistic is based on primary clusters (for example triphones), and a secondary statistic is based on secondary clusters (for example phonemes of entire words). Both statistics include average phone lengths and, for example, the standard variation of the average phone lengths. During the determination of phone lengths, it is firstly attempted to determine the average phone lengths and standard variation of the average phone lengths by reference to the secondary statistic which is more language-specific. If this is not the case, the primary statistic, which can always be applied, is resorted to. By this two stage method, a phone length is determined which corresponds significantly better to a natural language than has been possible with the conventional single stage method.

16 Claims, 3 Drawing Sheets

METHOD FOR GENERATING A STATISTIC FOR PHONE LENGTHS AND METHOD FOR DETERMINING THE LENGTH OF INDIVIDUAL PHONES FOR SPEECH SYNTHESIS

BACKGROUND OF THE INVENTION

1. Field of the Invention

The present invention relates to a method for generating a statistic for phone lengths, and to a method for determining the length of individual phones for speech synthesis.

2. Description of the Related Art

In the present application, a phoneme is taken to mean the smallest linguistic unit which distinguishes meaning, but does not bear meaning in itself (for example "b" in "beg" which can be distinguished from "p" in "peg"). On the other hand, a phone is the uttered sound of a phoneme.

Methods for generating a statistic for phone lengths in which the phone lengths can be controlled on the basis of this statistic during synthetic speech generation are known. In such methods, a text spoken by a speaker is recorded and the spoken and recorded text is segmented into individual phones. The sound length of the individual phones is determined. This phone length is registered in a statistic having a list of triphones. A triphone is a cluster of one or more phonemes with the respective context to the right and to the left.

In the known methods, in each case an average phone length or sound length is assigned to a phoneme of the triphones in their left-right context. This phone length is determined from all the phones of the spoken text which occur in the same context in the spoken text as in the respective triphone, that is to say its adjacent phones correspond to the adjacent phonemes in the triphone.

In the known method for determining the length of individual phones for speech synthesis, the phonemes of the text to be synthesized have assigned to them in the respective average sound length of the phoneme of the statistic whose context in the triphone corresponds to the context of the phoneme in the text to be synthesized. If, for example, the phone length of the phoneme "b" in the word "about" is to be determined, in the known method the phoneme "b" has assigned to it that phone length which is assigned in the statistic to the phoneme "b" in the triphone "abou". The context of the triphone and in the text to be synthesized are respectively identical here.

SUMMARY OF THE INVENTION

The invention is based on the object of providing a method for generating a statistic for phone lengths with which the phone lengths can be controlled on the basis of this statistic during synthetic speech generation, and a method for determining the length of individual phones for speech synthesis, the intention being that as a result of this, speech synthesis with more natural pronunciation than with known methods will be achieved.

The object is achieved by a method for generating a statistic for phone lengths on the basis of which the phone lengths can be controlled during synthetic speech generation by assigning phones of a spoken and recorded text which is segmented into phones, to phonemes of predetermined primary clusters which are composed of a plurality of phonemes, in each case one phone being assigned to a phoneme of a primary cluster if it occurs in the spoken text in a context which is identical or similar to the context of the phoneme of the primary cluster. A primary statistic is produced which includes at least the average phone length of all the phones assigned to the respective phoneme of a primary cluster. Then, phones of the spoken and recorded text are assigned to phonemes of predetermined secondary clusters which are composed of phonemes, at least the number of phonemes of some secondary clusters differing from the number of phonemes of the primary cluster, in each case one phone being assigned to a phoneme of a secondary cluster if it occurs in the spoken text in a context which is identical to the context of the phoneme of the secondary cluster, and a secondary statistic is produced which includes at least the average phone length of all the phones assigned to the respective phoneme of a secondary cluster.

The method according to the invention thus produces a primary statistic and a secondary statistic. The primary statistic can be based on primary clusters with, for example, three phonemes each, so that it corresponds to the triphone-based statistic described above. The secondary statistic is a further statistic based on secondary clusters whose number of phonemes differs at least partially from the number of phonemes of the primary clusters. As a result of this, a more language-specific statistic relating to the phone length is obtained.

Therefore, for example the primary clusters can comprise three phonemes and the secondary clusters four phonemes, as a result of which the larger context (four phonemes as against three phonemes) is taken into account in the determination of the average phone lengths so that as a result a significantly more language-specific evaluation is obtained.

According to one embodiment of the invention, the primary clusters have a constant number of phonemes, whereas the number of phonemes of the secondary clusters is variable. In this way, it is possible, for example, for the primary clusters each to comprise three phonemes and the secondary clusters each to comprise all the phonemes of a word. Using these secondary clusters, a word-specific evaluation of the phone lengths is then carried out which is significantly more precise than the evaluation on the basis of the triphones.

According to another embodiment of the invention, the secondary statistic covers only secondary clusters whose frequency in the text is greater than or equal to a predetermined minimum frequency. This ensures that non-significant frequencies are not taken into account in the statistic. It is thus expedient not to take into account words which only occur once or twice in the text on which the statistic is based.

The method according to the invention for determining the length of individual phones for speech synthesis is based on a phone length statistic formed of a primary statistic and a secondary statistic. This method includes determining whether the phoneme which is to be converted into speech and for which the phone length is to be determined is a component of a secondary cluster, assigning the average phone length of the secondary statistic to the corresponding phoneme in the respective secondary cluster, if the phoneme is a component of a secondary cluster, and assigning the average phone length of the primary statistic to the corresponding phoneme in the respective primary cluster, if the phoneme is not a component of a secondary cluster.

In this method, the more language-specific secondary statistic is preferably evaluated in the determination of the phone lengths. It is to be noted here that only identical contexts between the secondary cluster and the corresponding section in the spoken and recorded text on which the statistics are based are taken into account in the generation of the secondary statistic, whereas similar clusters are also taken into account in the primary statistic if there is no identical correspondence present. This is a further reason for which it is firstly attempted to evaluate the secondary statistic before the primary statistic is resorted to.

According to a preferred embodiment of the method for determining the length of individual phones, the standard variation of the individual average phone length is taken into account. This brings about further adaptation to a natural pronunciation.

BRIEF DESCRIPTION OF THE DRAWINGS

The invention is explained in more detail below by way of example with reference to the schematic, appended drawings, in which.

DETAILED DESCRIPTION OF THE PREFERRED EMBODIMENTS

Figure 1:
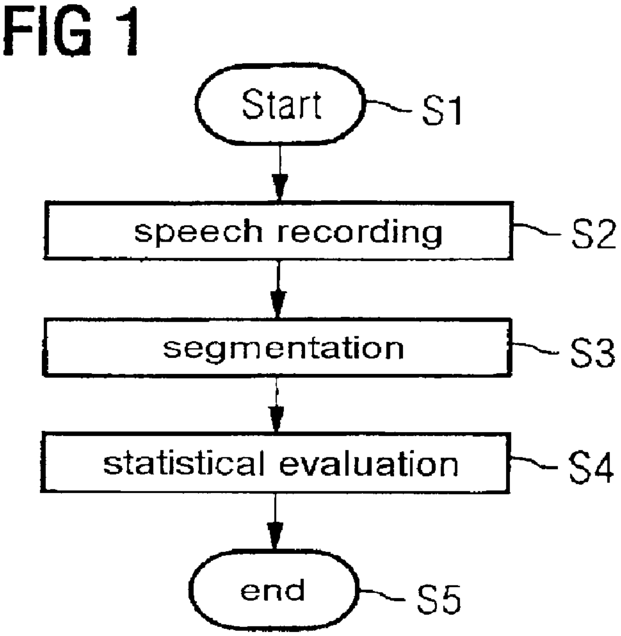
FIG. 1 is a flowchart of a general overview of the operations during the generation of a statistic of phone lengths.

FIG. 1 shows the basic operations for a method for generating a statistic for phone lengths on the basis of which the phone length can be controlled during synthetic speech generation.

The method starts with the step S1, and in step S2 a predetermined training text is spoken by a speaker and recorded. The recording is made using a microphone which converts the acoustic speech signals into corresponding electrical speech signals.

The recorded speech signal is segmented into individual phones in step S3. The segmentation of the speech signal into the individual phones is often carried out manually by a speech expert. Fully automatic and partially automatic methods which are usually based on an HMM (Hidden Markov Model) algorithms are also known.

In step S4, the individual phones are statistically evaluated, during which their length is determined. Phone lengths of phones which are assigned to the same phoneme in the same or similar context are evaluated statistically by calculating their average values and standard variations.

This method is terminated in step S5.

Figure 2:
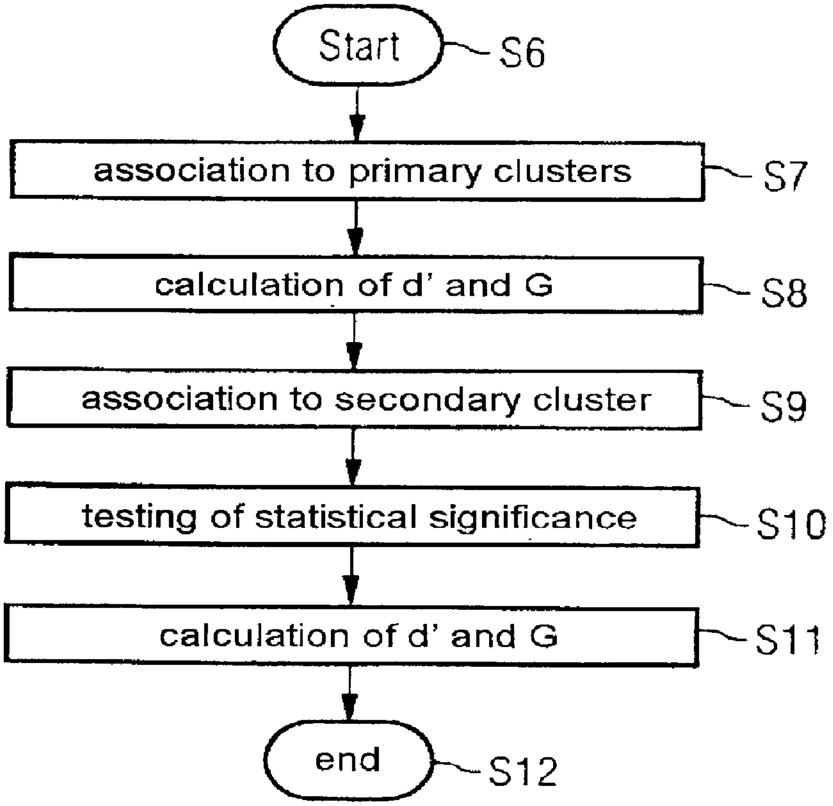
FIG. 2 is a flowchart of a method for statistically evaluating a speech recording to generate a statistic for phone lengths.

The method steps which are to be carried out according to the invention in the statistical evaluation (S4) are represented in a flowchart in FIG. 2. The statistical evaluation method starts with the step S6. Firstly, the individual phones of the training text are assigned to a primary cluster. In the present exemplary embodiment, the primary cluster is a triphone composed of three phonemes. A phone of the training text is assigned to the respective triphone whose middle phoneme corresponds to the phone of the training text and which has the same context as the section of the training text in which the phone which is to be assigned is arranged. This means that the phonemes which are adjacent to the middle phoneme of the triphone correspond to the adjacent phones of the phone which is to be assigned in the training text. If, for example, the phone of the phoneme “f” in the word “inform” is assigned to such a primary cluster, this phone is assigned to the phoneme “f” in the triphone “nfo” because the two adjacent phonemes “n” (to the left) and “a” (to the right) correspond to the corresponding phones of “n” and “a” in the training text.

The primary clusters are stored in a list which is defined in advance. If the primary clusters are triphones, such a list typically comprises 1500 to 2000 triphones. This list contains the most frequently occurring permutations of three successive phonemes. Permutations which sound rare and similar are combined in a cluster. Thus, for example the triphones “ter” and “der” can be combined in a cluster.

In the association according to step S7, the phones are thus assigned to the respective phonemes in the same context or in a similar context.

At the end of this association process, all the phones of the training text are assigned to the list of primary clusters, that is to say a list is produced in which the corresponding phones of the training text are stored for each primary cluster.

In step S8, the average phone length d' and the standard variation G for the respective middle phoneme of each primary cluster which comprises three phonemes are calculated. In the process, the sound lengths of the individual phones assigned to a primary cluster are averaged and stored as an average sound length, and the corresponding standard variation G is calculated. Thus, in step S8, a primary statistic is generated which corresponds essentially to the statistic which is mentioned at the beginning and which is known from the prior art.

In step S9, the individual phones are assigned to secondary clusters. In the present exemplary embodiment, the secondary clusters each comprise all the phonemes of a word. The length of the secondary clusters is thus variable. During the association of the phones to the secondary clusters, the words of the training text are determined and the individual phones of these words are assigned to the corresponding phonemes of the corresponding secondary clusters. An essential difference in comparison with step S7 is that here not only a phone is assigned to a cluster but also all the phones of a word are assigned to the corresponding phonemes of the secondary cluster, that is to say each of the phonemes of the secondary cluster is assigned a phone. In step S10, it is tested whether at least three phones of the training text have been assigned to each of the phonemes of the secondary clusters. If this is not the case, this means that the corresponding word in the training text occurs less than three times, and is therefore not statistically significant. Secondary clusters to which fewer than three words of the training text have been assigned are deleted.

In the present exemplary embodiment, the required frequency for significance is three. In order to achieve greater statistical reliability, it may expedient to specify an appropriately higher value.

In step S11, the average phone length d' and the standard variation G for each phoneme of the secondary cluster are calculated and stored. As a result of step S11, a secondary statistic based on the secondary clusters is obtained.

In step S12, the evaluation method is terminated.

With the exemplary embodiment shown in FIG. 2, a statistic is obtained which is significantly more language-specific because the individual phone lengths depend very greatly on the corresponding context, and a significantly more precise context is taken into account by virtue of the context of an entire word if this is statistically possible. If the sound length for speech synthesis is determined on the basis of such a two stage statistic, this permits a significantly more natural synthesis of the language.

Both other primary clusters and secondary clusters can be used within the framework of the invention. In particular, it is, for example, possible to use secondary clusters with a constant length of, for example, four phonemes. However, it could also be expedient in specific applications to use significantly longer secondary clusters which may comprise, for example, a complete phrase, a complete sentence or a complete paragraph. The longer the secondary clusters which are selected, the more specific the field of application of the speech synthesis should be. A typical example for a very specific application area for speech synthesis is a navigation system for motor vehicles in which very similar sentences and sentence structures are generated repeatedly.

Figure 3:
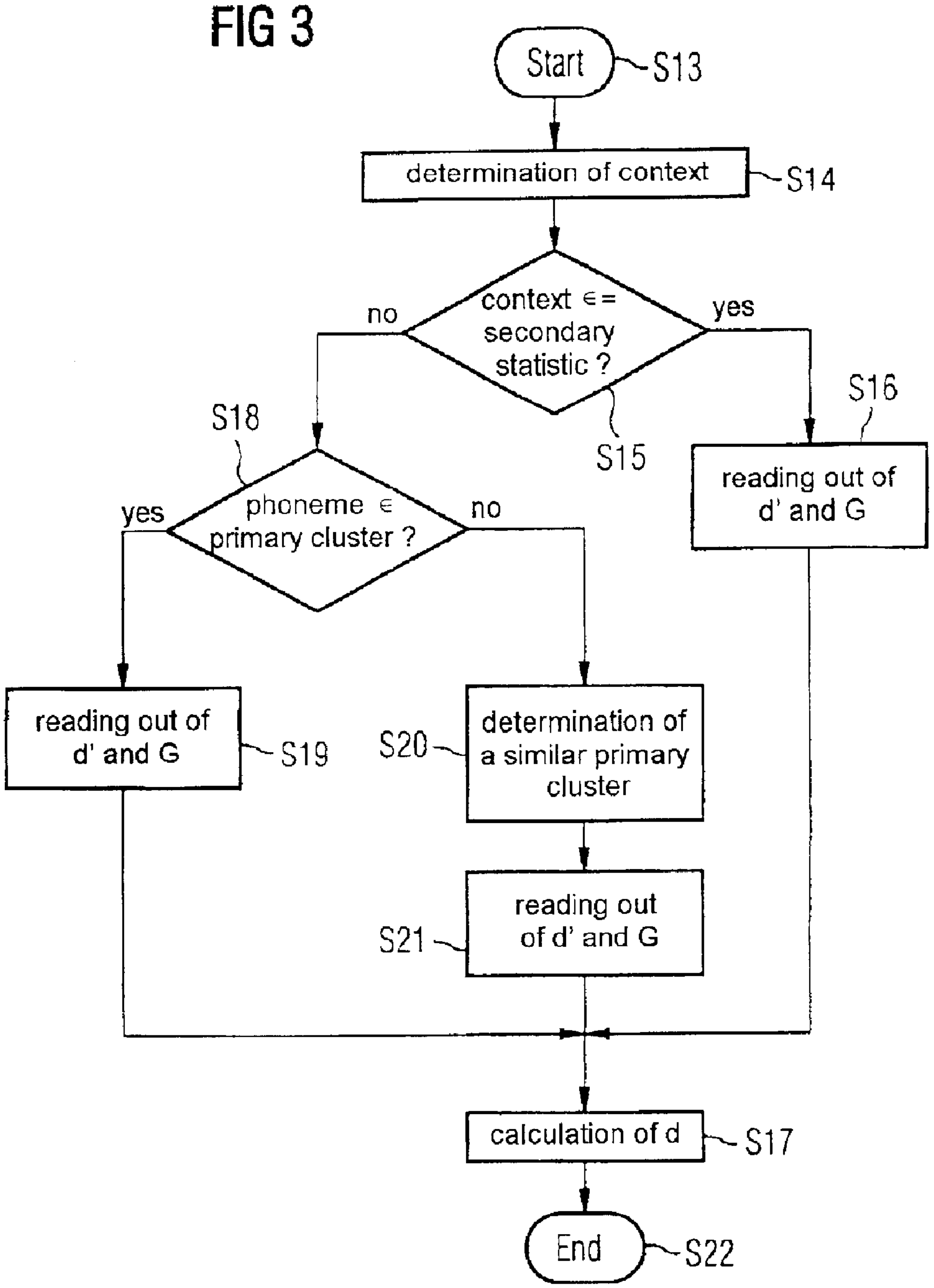
FIG. 3 is a flowchart of a method for determining the length of individual phones for speech synthesis in a flowchart.

FIG. 3 is a flowchart of a method for determining individual phones for speech synthesis. The starting point of the method is that a phoneme of an text which is to be synthesized is converted into a phone and the length of this phone is to be determined.

The method starts with the step S13. In step S14, the context of the phoneme is determined in the source text. Here, the scope of the context is expediently selected such that it corresponds to the length of the secondary cluster. In the present exemplary embodiment, the context is determined within the scope of a word.

In step S15, it is tested whether the context which is determined in step S14 is stored as a secondary cluster in the secondary statistic. If this is the case, the program sequence goes over to step S16 with which the average phone length d' which is assigned to that phoneme of the secondary cluster which corresponds to the phoneme of the source text, and the phone lengths and the standard variation are read out. The program sequence then goes over to step S17 in which the phone length d which is to be actually applied is calculated from the average phone length d' and the standard variation G according to the following formula:

$$d=d'+G\cdot s,$$

s being a speed scaling factor which is calculated according to the following formula:

$$s=Rrel-1,$$

Rrel being the ratio of the speech speed to be spoken with respect to the speech speed with which the text on which the statistic is based has been spoken. By taking into account the standard variation, phones which the speaker of the training text has spoken with very different lengths are varied to a corresponding degree in the speech synthesis. For example, plosive sounds such as "k" are varied very little, for which reason they have a very small standard variation. They are varied to a correspondingly small degree in the speech synthesis. Vowels, for example "a" are varied greatly, for which reason they have a correspondingly large standard variation. With regard to the above formulas it is to be taken into account that the speed scaling factor s can also assume negative values, for which reason the phone length is correspondingly shortened in comparison with the average phone length.

If, on the other hand, the result of the interrogation in step S15 is that the context determined in step S14 is not contained in the secondary statistic, the method sequence goes over to step S18. In step S18 it is tested whether the portion of the context in the vicinity of the phoneme which is to be converted is identical to a primary cluster in the primary statistic. If this is the case, the method sequence goes over to step S19. In step S19, the average phone length and the standard variation of the middle phoneme of the corresponding primary cluster are read out. The method sequence then goes over to step S17 with which the phone length which is to be actually applied is calculated in the manner explained above.

If the result of the interrogation in step S18 is that the primary statistic does not contain any primary cluster which is identical to the context of the source text, the method sequence goes over to the step S20 in which a primary cluster which is as similar as possible to the context in terms of sound is determined.

From the following step S21, the average phone length and the standard variation of the middle phoneme of this primary cluster are read out. The method sequence then goes over to step S17.

After step S17 has been carried out, the method for determining the length of a phone of a phoneme of a source text is terminated in step S18.

The method according to the invention for determining the phone lengths for speech synthesis is thus a two stage method in which it is firstly attempted to determine, by means of the secondary statistic, an average phone length which is based on a specific context (word length in this case), as a result of which a sound length is determined which is significantly more similar to the natural way of speaking than the phone length determined on the basis of the primary statistic. If this determination of the phone length by means of the secondary statistic is not possible, the primary statistic, which can basically always be applied, is resorted to.

In particular the combination of the method for generating the statistic and the method for determining the phone length constitutes an essentially purely statistical method for determining the phone length which can be produced and applied essentially without expert knowledge. In the exemplary embodiment described above, for example, expert knowledge is used only in the segmentation of the speech recording, and this step can also be automated using known methods.

The methods according to the invention are thus easy to implement and to train. Nevertheless, first attempts with prototypes have shown that they provide a significant increase in speech quality in speech synthesis because the phone length is determined in a more language-specific way by virtue of the provision of the secondary statistic.

The methods described above may be implemented as computer programs which run independently on a computer for generating the statistic and/or determining the phone lengths. They thus constitute methods which can be carried out automatically.

The computer programs can also be stored on electrically readable data carriers, and can thus be transmitted to other computer systems.

Figure 4:
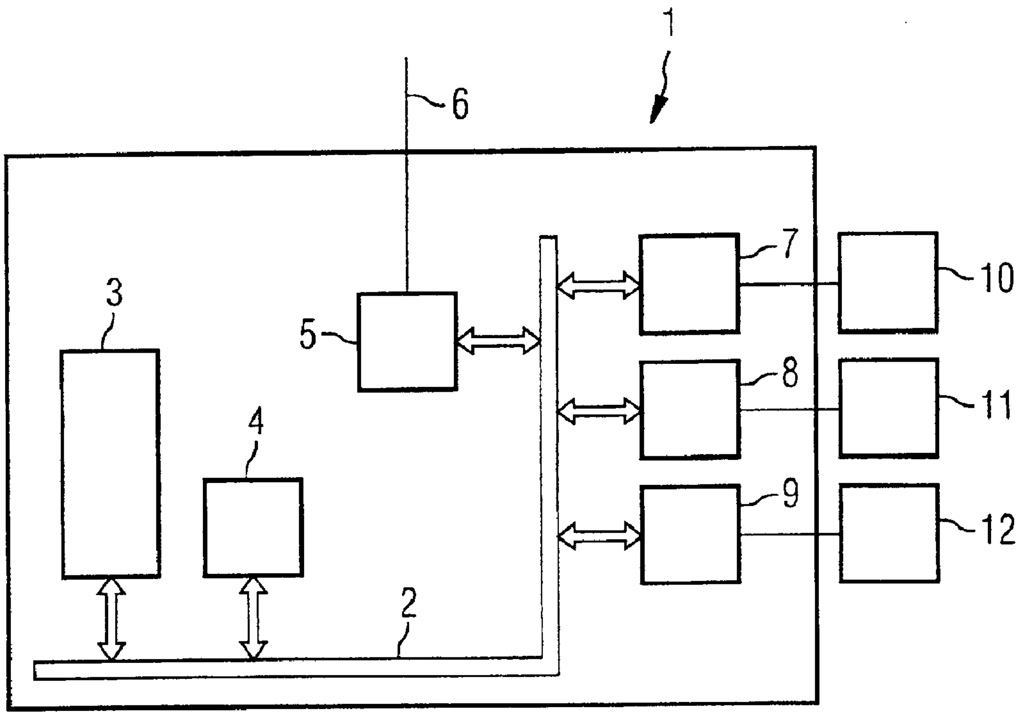
FIG. 4 is a block diagram of a computer system for carrying out the methods according to the invention.

A computer system which is suitable for applying the method according to the invention is shown in FIG. 4. The computer system 1 has an internal bus 2 which is connected to a storage area 3, to a central processor unit 4, and to an interface 5. The interface 5 establishes a data link to other computer systems via a data line 6. In addition, an acoustic output unit 7, a graphic output unit 8 and an input unit 9 are connected to the internal bus 2. The acoustic output unit 7 is connected to a loud speaker 10, the graphic output unit 8 is connected to a screen 11, and the input unit 9 is connected to a keyboard 12. Speech recordings of a text which are stored in the storage area 3 can be transmitted to the computer system 1 via the data line 6 and the interface 5. The storage area 3 is divided into a plurality of areas in which speech recordings, audio files, application programs for carrying out the methods according to the invention and further application programs and service programs are stored. The speech files are analyzed with predetermined program packages and segmented into the individual phones. The method according to the invention for generating a statistic is then carried out, the primary statistic and secondary statistic being obtained as a result.

A text which is stored, for example via the data line 6 and the interface 5, in the storage area 3 can then be converted into an audio file, the phone length being determined by means of the method according to the invention (FIG. 3) on the basis of the primary and secondary statistics.

An audio file which is generated in this way is transmitted via the internal bus 2 to the acoustic output unit 7 and output by it as speech at the loud speaker 10.

What is claimed is:

1. A method for generating a statistic for phone lengths, with which the phone lengths can be controlled on the basis of this statistic during synthetic speech generation, comprising:

assigning phones of a spoken and recorded text that is segmented into phones, to phonemes of predetermined primary clusters composed of a plurality of phonemes, in each case one phone being assigned to a primary phoneme of one of the predetermined primary clusters if present in the spoken text in a context which is identical or similar to the context of the primary phoneme;

producing a primary statistic including at least an average phone length of all the phones assigned to a corresponding phoneme of one of the predetermined primary clusters;

assigning phones of the spoken and recorded text to phonemes of predetermined secondary clusters composed of phonemes, a number of phonemes of at least some secondary clusters differing from a number of phonemes of the predetermined primary clusters, in each case one phone being assigned to a secondary phoneme of one of the predetermined secondary clusters if present in the spoken text in a context which is identical to the context of the secondary phoneme; and producing a secondary statistic including at least an average phone length of all the phones assigned to the secondary phoneme.

2. The method as recited in claim 1, wherein the number of phonemes of the primary clusters is constant.

3. The method as recited in claim 2, wherein the number of phonemes of the secondary clusters is variable, and the secondary clusters each include the phonemes of a word.

4. The method as recited in claim 3, wherein the primary statistic and the secondary statistic each includes a standard variation of a phone length.

5. The method for generating a statistic as claimed in claim 4, wherein the secondary statistic covers only selected secondary clusters whose frequency in the text is at least as large as a predetermined minimum frequency.

6. The method for generating a statistic as claimed in claim 5, wherein the minimum frequency is in the range from 3 to 10.

7. The method for generating a statistic as claimed in claim 6, wherein the phones are assigned to phonemes of the predetermined primary clusters using a predetermined list of phonemes grouped into the predetermined primary clusters, the phones being assigned to individual phonemes of the predetermined primary clusters in the list, and each individual association being stored.

8. The method as claimed in claim 7, wherein in each case the average phone length and the standard variation of the average phone length are calculated for the individual phonemes of the predetermined primary clusters in the list based on the individual associations that are stored.

9. The method as recited in claim 2, wherein the number of phonemes in each of the predetermined primary clusters is equal to 3.

10. The method as claimed in claim 1, wherein the phones are assigned to the phonemes of the predetermined secondary clusters using a predetermined list of phonemes grouped into the predetermined secondary clusters, the phones being assigned to individual phonemes of the predetermined secondary clusters in the list, and each individual association being stored.

11. The method as claimed in claim 10, wherein in each case the average phone length and the standard variation of the average phone length are calculated for the individual phonemes of the secondary clusters in the list on the basis of the stored associations.

12. A method for determining a length of individual phones for speech synthesis, comprising:

calculating a primary statistic for phone lengths based on primary phonemes grouped into primary clusters and an average phone length assigned to the primary phonemes;

calculating a secondary statistic for phone lengths based on secondary phonemes grouped into secondary clusters and an average phone length assigned to the secondary phonemes;

determining whether a specified phoneme to be converted into speech and having a defined phone length has a corresponding phoneme in a respective secondary cluster;

assigning the average phone length of the secondary statistic to the corresponding phoneme in the respective secondary cluster if the specified phoneme matches the corresponding phoneme in the respective secondary cluster, and assigning the average phone length of the primary statistic to a corresponding phoneme in a respective primary cluster if the specified phoneme does not match any phoneme in the secondary clusters.

13. A method as claimed in claim 12, wherein standard variations (G) of the average phone lengths (d') stored in the statistic are taken into account in determining the length (d) of the individual phones in accordance with the following formula $$d=d'+G\cdot s,$$

where s is a speed scaling factor which is calculated according to the following formula $$s=Rrel-1,$$

Rrel being a ratio of speech speed to be spoken with respect to the speech speed with which the text on which the statistic is based has been spoken.

14. A method for determining the length of the individual phones in speech synthesis, comprising:

assigning phones of a spoken and recorded text that is segmented into phones, to phonemes of predetermined primary clusters composed of a plurality of phonemes, in each case one phone being assigned to a primary phoneme of one of the predetermined primary clusters if present in the spoken text in a context which is identical or similar to the context of the primary phoneme;

producing a primary statistic including at least an average phone length of all the phones assigned to a corresponding phoneme of one of the predetermined primary clusters;

assigning phones of the spoken and recorded text to phonemes of predetermined secondary clusters composed of phonemes, a number of phonemes of at least some secondary clusters differing from a number of phonemes of the predetermined primary clusters, in each case one phone being assigned to a secondary phoneme of one of the predetermined secondary clusters if present in the spoken text in a context which is identical to the context of the secondary phoneme;

producing a secondary statistic including at least an average phone length of all the phones assigned to the secondary phoneme;

determining whether a specified phoneme to be converted into speech and having a defined phone length has a corresponding phoneme in a respective secondary cluster;

assigning the average phone length of the secondary statistic to the corresponding phoneme in the respective secondary cluster if the specified phoneme matches the corresponding phoneme in the respective secondary cluster; and assigning the average phone length of the primary statistic to a corresponding phoneme in a respective primary cluster if the specified phoneme does not match any phoneme in the secondary clusters.

15. A computer system having a storage area in which a program is stored for carrying out a method for generating a statistic for phone lengths, with which the phone lengths can be controlled this statistic during synthetic speech generation, comprising:

assigning phones of a spoken and recorded text that is segmented into phones, to phonemes of predetermined primary clusters composed of a plurality of phonemes, in each case one phone being assigned to a primary phoneme of one of the predetermined primary clusters if present in the spoken text in a context which is identical or similar to the context of the primary phoneme;

producing a primary statistic including at least an average phone length of all the phones assigned to a corresponding phoneme of one of the predetermined primary clusters;

assigning phones of the spoken and recorded text to phonemes of predetermined secondary clusters composed of phonemes, a number of phonemes of at least some secondary clusters differing from a number of phonemes of the predetermined primary clusters, in each case one phone being assigned to a secondary phoneme of one of the predetermined secondary clusters if present in the spoken text in a context which is identical to the context of the secondary phoneme; and producing a secondary statistic including at least an average phone length of all the phones assigned to the secondary phoneme.

16. A computer system having a storage area in which a program is stored for carrying out a method for determining the length of individual phones for speech synthesis, comprising:

calculating a primary statistic for phone lengths based on primary phonemes grouped into primary clusters and an average phone length assigned to the primary phonemes;

calculating a secondary statistic for phone lengths based on secondary phonemes grouped into secondary clusters and an average phone length assigned to the secondary phonemes;

determining whether a specified phoneme to be converted into speech and having a defined phone length has a corresponding phoneme in a respective secondary cluster;

assigning the average phone length of the secondary statistic to the corresponding phoneme in the respective secondary cluster if the specified phoneme matches the corresponding phoneme in the respective secondary cluster; and assigning the average phone length of the primary statistic to a corresponding phoneme in a respective primary cluster if the specified phoneme does not match any phoneme in the secondary clusters.

* * * * *